(12) United States Patent
Ersoy et al.

(10) Patent No.: US 8,118,314 B2
(45) Date of Patent: Feb. 21, 2012

(54) SWITCHABLE STABILIZER DEVICE

(75) Inventors: Metin Ersoy, Walluf (DE); Jens Vortmeyer, Preussisch Oldendorf (DE); Bernd Grannemann, Espelkamp (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 262 days.

(21) Appl. No.: 12/231,003

(22) Filed: Aug. 28, 2008

(65) Prior Publication Data

US 2009/0058020 A1 Mar. 5, 2009

(30) Foreign Application Priority Data

Aug. 28, 2007 (DE) .......................... 10 2007 040 736

(51) Int. Cl.
*B60G 21/05* (2006.01)

(52) U.S. Cl. ........... 280/5.511; 280/124.106; 280/5.506; 280/124.152

(58) Field of Classification Search ............... 280/5.506, 280/5.508, 5.511, 124.106, 124.107, 124.137, 280/124.149, 124.152, 124.13; 192/69.8, 192/69.82, 69.83; 74/424.82
See application file for complete search history.

(56) References Cited

U.S. PATENT DOCUMENTS

| | | | | |
|---|---|---|---|---|
| 4,206,935 A * | 6/1980 | Sheppard et al. | .......... | 280/5.508 |
| 4,621,831 A * | 11/1986 | Takadera et al. | ........ | 280/124.106 |
| 6,513,819 B1 * | 2/2003 | Oliver et al. | ........... | 280/124.152 |
| 6,951,341 B1 * | 10/2005 | Beetz et al. | ................ | 280/5.511 |
| 7,150,458 B2 * | 12/2006 | Reichel et al. | ............. | 280/5.511 |
| 7,226,056 B2 * | 6/2007 | Barron | ........................ | 280/5.511 |
| 7,237,785 B2 * | 7/2007 | Kraus et al. | ............ | 280/124.106 |
| 2005/0212224 A1 * | 9/2005 | Osterlanger et al. | ....... | 280/5.511 |
| 2008/0000710 A1 * | 1/2008 | Vortmeyer et al. | .......... | 180/282 |

(Continued)

FOREIGN PATENT DOCUMENTS

DE 19923100 C1 2/2001

(Continued)

OTHER PUBLICATIONS

Endo et al., Stabilizer Control Device, Feb. 15, 2007, JPO, JP 2007-038893 A, English Abstract.*

(Continued)

*Primary Examiner* — Paul N Dickson
*Assistant Examiner* — James English
(74) *Attorney, Agent, or Firm* — Raymond R. Ferrara; Adams and Reese LLP

(57) ABSTRACT

The invention relates to a switchable stabilizer device for the axle of a motor vehicle. Herein, the actuating device comprises a roll stabilizer and an actuatorically switchable coupling device (6) with two clutch devices (7, 8) and a locking sleeve (9).

According to the present invention, the stabilizer device is characterized by a shifting device for shifting the locking sleeve (9) by means of mechanical power transmission. Herein, the shifting device has a servo-electric transmission drive element (4).

The present invention provides a robust and compact switchable roll stabilizer, which can be produced cost-efficiently. At the same time, the present invention allows for the actuatoric support of the opening movement as well as the locking movement of the stabilizer coupling with very short shifting times.

The switchable stabilizer according to the present invention is suitable for motor vehicles, for example, which are employed off-road as well as on the road. Due to the extremely short shifting times of the stabilizer coupling, the stabilizer device according to the present invention may be used furthermore for an active running gear to support the vehicle dynamics in real time.

14 Claims, 3 Drawing Sheets

U.S. PATENT DOCUMENTS

2008/0111325 A1* 5/2008 Grethel et al. ............ 280/5.508
2009/0166990 A1* 7/2009 Reitz et al. ................ 280/5.506

FOREIGN PATENT DOCUMENTS

| DE | 102 39 657 B3 | | 4/2004 |
| DE | 102 45 363 A1 | | 4/2004 |
| DE | 103 58 762 A1 | | 7/2005 |
| DE | 10 2004 048 085 A1 | | 4/2006 |
| EP | 1 236 592 A2 | | 9/2002 |
| JP | 2006240616 A | * | 9/2006 |
| JP | 2007038893 A | * | 2/2007 |
| JP | 2007038894 A | * | 2/2007 |

OTHER PUBLICATIONS

Endo et al., Stabilizer Control Device, Feb. 15, 2007, JPO, JP 2007-038893 A, Machine translation of Description.*
Sugawara et al., Stabilizer for Vehicle, Sep. 14, 2006, JPO, JP 2006-240616 A, Machine Translation of Description.*
Sugawara et al., Stabilizer for Vehicle, Sep. 14, 2006, JPO, JP 2006-240616 A, English Abstract.*

* cited by examiner

SWITCHABLE STABILIZER DEVICE

STATEMENT OF RELATED CASES

Pursuant to 35 U.S.C. 119(a), the instant application claims priority to prior German application number 10 2007 040 736.1, filed Aug. 28, 2007.

DESCRIPTION OF THE INVENTION

The invention relates to a switchable stabilizer device with a roll stabilizer and a coupling device for an axle of a motor vehicle according to the preamble of claim 1 of the present invention.

Generally, each of the axles of a motor vehicle is provided with a roll stabilizer, which works according to the torsion bar principle. The roll stabilizer is arranged essentially parallel to the vehicle axle and is connected at both ends with the respective wheel suspensions.

Here, the roll stabilizer serves for stabilizing the body framework—for example during banking or cornering maneuvers of the motor vehicle—against undesired roll movements around the longitudinal axis of the motor vehicle. This can be achieved by coupling the deflection movement of the left and right wheel suspensions (facing the direction of travel) of an axle with each other to a certain extent by means of the roll stabilizer. In other words, the roll stabilizer produces a partial copy effect between the deflection movements of the two wheels of one axle.

In this case however, roll stabilizers in one piece are designed in their dimensioning for only one predetermined spring rate, so that a given difference of the deflection paths at one axle or that is to say a given roll angle of the car body relative to the road surface is always assigned to a given torsional moment in the roll stabilizer.

As a whole, the function of the roll stabilizer described above is highly desired in on-road vehicles—for the purpose of stabilizing the car body during cornering maneuvers; in off-road vehicles, on the other hand, a spring deflection characteristics is demanded which is totally different from that. Craggedness occurring off-road require permissible axle displacements which are as big as possible, to guarantee road grip of all wheels of the motor vehicle. This is even more important the more slippery the underground is, because a transmission of a sufficient traction from the wheel to the underground is only possible with good road grip and sufficient downforce. Concerning off-road vehicles, the tilted position of the motor vehicle framework is furthermore to be maintained as low as possible, if the difference between the deflection paths of the two wheels of one axle is big to make an overbalancing of the vehicle difficult, if, for instance, it is moved diagonally to an incline. Last but not least, the stabilizer may be overloaded due to highly different deflection paths of the wheels of one axle occurring off road and as a result it may be damaged.

Similarly, the connection between both of the wheel suspensions of one axle via the stabilizer also is theoretically undesired in on-road vehicles—during straight running on the road, because it doesn't serve any purpose in this case, but impairs the suspension comfort due to the copy effect between the two wheel suspensions of one axle.

For these reasons, the effect of the roll stabilizer is rather undesired in on-road vehicles during straight running as well as in off-road vehicles. Initially, in off-road vehicles, which are primarily not destined for road traffic, and in on-road vehicles, which are not used off road, the diametrically opposed requirements for the roll stabilization for on-road operation on the one hand side and for the off-road operation on the other hand discussed above don't cause any problems, because the roll stabilizers can be adjusted individually to the respective operating conditions under these circumstances.

This means, however, that roll stabilizers in one piece can only be designed correctly either for on-road traffic or only for off-road traffic, whereas in vehicles, which are to be operated on-road as well as off-road, the spring rate of an roll stabilizer in one piece represents only a compromise.

For some time now, however, off-road vehicles have become attractive as on-road vehicles as well, so that the requirement of a relatively low roll stabilization off-road is opposed to the requirement of a relatively strong stabilization during cornering maneuvers during road traffic.

Therefore, possibilities for roll stabilizers being divided into two pieces are increasingly searched for, wherein both parts of the roll stabilizers can be connected with each other by means of an actuatorically switchable coupling device. Such a switchable roll stabilizer is disclosed, for example, in DE 199 23 100 C1, wherein a hydraulically switchable clutch coupling is interposed between the two stabilizer parts. This clutch coupling permits either coupling of the two stabilizer parts with each other in a torsionally stiff manner or else allowing a certain neutral rotational angle between the two stabilizer parts before torsional forces are transmitted and thus a corresponding copy effect between the deflection movements of the two wheels of one axle occurs.

In this manner, the possible torsion angle between the two stabilizer ends can thus be enlarged in case of need, which is a benefit, in particular, for the off-road use of a motor vehicle thus furnished. While using this motor vehicle on road, the two stabilizer parts are coupled torsionally stiff with each other by means of the coupling and as a result the desired roll stabilization of the body framework during cornering maneuvers is thus achieved.

However, the hydraulically operated coupling devices for roll stabilizers known from the state of the art present a variety of drawbacks. First of all, the assembling of the coupling device using a hydraulic operation for the clutch coupling is constructively intricate and tends to result therefore in high production costs. In addition, the function of the hydraulic operation in the known coupling device with a single-acting hydraulic cylinder is limited to only one operation direction. This means, that the known coupling device described above can only either be closed or opened actuatorically, whereas an actuatorically operation of both the closing as well as the opening operation with the hydraulic force is not possible.

As the known hydraulic coupling device is so designed, due to safety reasons, that in case of a failure of the electronic or the hydraulic system an automatic closing of the stabilizer coupling occurs, the mentioned limitation, which exists in case of the hydraulic operation means, that the actuatorically supported coupling can only be opened, but cannot be closed. In fact, the closing of the stabilizer coupling in the known coupling device is merely left to a compression spring. Therefore, an active closing of the coupling, under partial load where appropriate, is not possible with the hydraulically operated stabilizer coupling known from the state of the art.

In addition the hydraulic operation entails a relatively slow operation speed for the stabilizer coupling due to throttling points always present in flow paths of hydraulic systems. Therefore, a very rapid reversing of the coupling state in dependence of, for example, the driving state of the motor vehicle is excluded for the known hydraulic stabilizer coupling.

Regarding this background, it is an object of the present invention to provide a switchable stabilizer device that permits to overcome the described drawbacks of the state of the art. In particular, the stabilizer device is to be simply and robustly designed and, at the same time, a cost efficient production of the device is to be possible. In addition, the present invention is to provide for the actuatoric support of the opening movement as well as the locking movement of the stabilizer coupling, and is to increase the reaction speed and reduce the necessary time for closing and opening of the stabilizer coupling, respectively. It is also to provide an adjustability with regard to a stepless opening or closing of the stabilizer coupling.

This object is solved by means of a stabilizer device with the features of claim 1 of the present invention.

Preferred embodiments are subject matter of the dependent claims.

The stabilizer device according to the present invention comprises, in a manner initially known per se, a roll stabilizer and also an actuatorically switchable coupling device. Here, the roll stabilizer is formed so, that it is divided into two parts, i.e. into a left stabilizer half and into a right stabilizer half, wherein the stabilizer halves are positively connectable with each other by means of the coupling device. The term "stabilizer half" is used herein for descriptive purposes only and is particularly not to be construed as a limitation to a roll stabilizer that is divided non-symmetrically or non-centrically and has stabilizer parts with different sizes.

The coupling device comprises, also in a manner initially known per se, two clutch devices, which are connected with each of the stabilizer halves in the region of the coupling devices, as well as a locking sleeve, which is axially shiftable back and forth between a locking position and an unlocking position. Here, the locking clutches of the two clutch devices overlap at least partial in axial direction of the stabilizer as well as in radial direction of the stabilizer, wherein at least one gap exists between the locking clutches of the clutch devices in tangential direction of the stabilizer. The shiftable locking sleeve further presents at least one locking finger which can be received positively in the at least one tangential gap between the locking clutches of the clutch devices and which can, in this manner, couple the clutch devices rotational rigidly by filling the tangential gap between the locking clutches.

According to the present invention the stabilizer device is characterized in that the shifting of the locking sleeve via mechanical power transmission occurs by means of a shifting device. Herein, the shifting device features a servo-electric transmission drive element.

As a result, the drawbacks of the hydraulic drive system of the stabilizer device known from the state of the art, which were mentioned in the opening paragraph, are overcome. Due to the shifting device, which is operated by means of the servo-electric transmission drive element, it is possible to shift the locking sleeve actuatorically back and forth between the locked position and the unlocked position and that steplessly in both direction, as opposed to the hydraulic operation known from the state of the art. Furthermore, the servo-electric operation of the shifting device permits operating the locking sleeve more quickly and shifting it between the locked position and the unlocked position. As a result the stabilizer coupling can be opened much more quickly and, in particular, can be closed much more quickly so that it is alternatively also possible to react dynamically within tens of seconds to the actual driving state of the motor vehicle.

Finally the stabilizer device according to the invention is also simpler in terms of construction, more compact in terms of dimensioning, more robust in use and results therefore in cost savings in production and mounting as well as in operation.

According to a preferred embodiment of the invention, the locking sleeve is not fixed rotationally, neither with respect to the left nor with respect to the right stabilizer half. This means in other words, that the locking sleeve can be moved rotationally free to a large extent. This results in a free rotation angle between both of the stabilizer halves or else between the clutch devices assigned to said stabilizer halves, the angle corresponding to the total tangential gap angle between the locking clutches of the two clutch devices even when the locking finger of the locking sleeve remains partially engaged or overlaps partially with the tops of the locking clutches of the clutch devices due to safety reasons.

In other words, the locking sleeve can follow in this case—as it can be rotated freely—the rotational movements of that stabilizer half, against whose tops of the locking clutches it bears at that moment, without thereby hindering or limiting the free relative twisting between both of the stabilizer halves within the tangential gap angle.

Firstly, the invention can be realized herein irrespective of how the shifting device is formed and arranged constructionally, as long as the locking sleeve can be operated reliably therewith. According to a particularly preferred embodiment of the invention the shifting device, however, presents a spindle drive element with a threaded spindle. Preferably the spindle drive element further comprises a recirculating ball nut.

The formation of the shifting device as a spindle drive element is advantageous in that a spindle drive element corresponds well with the elongated cylindrical shape of the center part of the stabilizer and can therefore be accommodated space-savingly at the center part of the stabilizer. In addition, a spindle drive element presents a very high transmission rate between the input speed and spindle speed, whereby a multi-stage reduction gear becomes unnecessary. The realization of the spindle drive element with a recirculating ball nut results in an extremely smooth operation and in a high efficiency of the spindle drive element itself even under high load. This means that loss of engine performance due to gear friction is small and that the operation of the stabilizer coupling can be performed even under load if the servomotoric drive element is designed appropriately.

According to a particularly preferred embodiment of the invention, the coupling device of the stabilizer device presents a compression spring for supporting the locking movement of the locking sleeve. In this manner, the movement of the locking sleeve in direction of the locked 30, position can be supported by the clutch devices of the stabilizer halves and can optionally be accelerated without the requirement of a corresponding increase in size of the servomotor design.

Moreover, the spindle drive element is preferably formed not self-blocking. In this way, the possibility of the realization of an automatic fail-safe operation of the coupling device results—in particular through the co-operation with a compression spring for supporting of the locking movement of the locking sleeve. As a result of the energy retained in the compression spring, the spindle drive can consequently be actuated together with the servomotoric drive element in case of a failure of the power supply of the servomotoric drive element and an automatic locking of the coupling devices can take place. Thus, the normal functioning of the roll stabilizer for on-road driving is guaranteed even when control or power supply of the servomotoric drive element should fail.

According to another preferred embodiment of the invention, the stabilizer device further comprises an actuator device for blocking the servo-electric drive element in the direction of rotation used for closing the coupling device. In this case, the actuator device is preferably formed so that said device is deactivated in case of power supply failure and the blocking of the servo-electric drive element consequently is lifted.

Thanks to the actuator device for blocking the servo-electric drive element, the coupling device can—because of the high transmission ratio of the spindle drive element—be blocked particularly in the opened state without the need of considerable operation forces for this. If the blocking device—for example due to failure of the power supply at the stabilizer device—is switched into a currentless state, the blocking of the servo-electric drive element is removed automatically and automatic closing of the coupling device by means of the compression spring is induced.

According to a preferred embodiment of the invention, the threaded spindle is essentially formed like a hollow cylinder and encloses the stabilizer coaxially in the region of its straight center part or else in the coupling region of one of the two stabilizer halves. As a result, an especially space-saving arrangement of the coupling drive element in the region of the center part of the stabilizer is achieved.

Preferably, the compression spring in turn encloses the threaded spindle coaxially. Additionally preferred, the locking clutches of the stabilizer halves and the locking fingers of the locking sleeve are arranged in the same radial diameter region of the coupling device as the compression spring and the spindle nut. In this manner, an extremely space-saving, compact and robust design of the coupling device can be achieved, since as a result the stabilizer, threaded spindle and compression spring mutually overlap in axial direction and can be piled up directly one upon the other in radial direction at the same time. In addition, a particular direct transmission of power from the spindle nut to the compression spring, which can be arranged in the same radial diameter region, and from the compression spring in turn to the locking sleeve and to the locking clutches can be achieved without any detour.

Another preferred embodiment of the invention envisages that the active surfaces of the clutch devices and/or the locking sleeve are formed in a wedge shape with steps. Herein, a first step of the thus formed active surfaces has a not self-blocking wedge angle, whereas a second step of the active surfaces presents a virtually self-blocking wedge-angle.

Thanks to the second step of the active surfaces at the clutch devices and/or at the locking sleeve, which are formed virtually self-blocking, it can be guaranteed that the stabilizer coupling remains in the locked state even under a high torsion load without the need for applying—in addition to the force of the compression spring—axial locking forces by means of the shifting device. At the same time, the active surfaces, which are formed not self-blocking and consequently present a bigger wedge angle than the active surfaces of the second step, facilitate the rapid opening and closing of the stabilizer coupling by reducing thereby the axial shifting path of the locking sleeve that is required for opening or closing.

Finally, another embodiment of the invention envisages that the stabilizer device is provided with a sensor device for detecting cornering maneuvers or alternatively that it can be connected with a sensor device for detecting cornering maneuvers. Preferably, the stabilizer device is formed herein so that the coupling device is disengaged, more preferred partially disengaged, during straight running on the road. Partially disengaged means here that the active surfaces of the locking sleeve still overlap partial with the active surfaces of the clutch devices at the stabilizer halves in axial direction of the stabilizer.

At the same time, the coupling device is arranged herein to result in an automatic coupling of the stabilizer halves on detecting—for example during normal road journey—the beginning of a bend of the road. In other words this means that the roll stabilizer is not only disconnected off-road but also during straight running on the road and that a temporary coupling of both stabilizer halves and thus an activation of the stabilizer occurs only when and as long as the vehicle passes through a bend of the road.

In this manner, optimal suspension comfort is achieved concomitant with high directional stability in bends, particularly since the effects of one sided unevenness of the road surface during straight running are not transmitted undesirably—and enhanced by the roll stabilizer—to the body framework as is the case in the state of the art.

Against this background, according to another preferred embodiment of the invention, it is envisaged that the actuation path oft the locking sleeve is steplessly adjustable. Thus, a controlling oft the effective stabilizer rigidity or a stepless adjustment of the response threshold of the stabilizer can be carried out by means of a partial disengaging of the stabilizer halves. Preferably, only a partial disengaging of the stabilizer halves is carried out herein during straight running on the normal road so that a complete and rigid coupling of the stabilizer halves via appropriate shifting movements of the locking sleeve can be carried out quickly at all times. Solely during off-road running the locking sleeve is deployed over the whole length of the shifting path from the region of the locking clutches at the stabilizer halves to unblock the maximally possible free rotatability of the stabilizer halves against each other.

However, a slight axial residual overlap of the locking fingers of the locking sleeve and the locking clutches of the stabilizer halves can be provided in this case as well. Thus, the locking sleeve finds its way back into the gaps between the locking clutches of the two stabilizer halves at all times, without the danger that the tooth crests of locking sleeve and stabilizer half meet each other whereby the closing movement of the locking sleeve would be blocked.

The invention will now be explained in more detail with reference to drawings merely presenting embodiments of the invention, in which:

BRIEF DESCRIPTION OF THE DRAWINGS

FIG. 1 represents a schematic isometric projection of the center part of a stabilizer device according to the present invention.

DETAILED DESCRIPTION OF THE INVENTION

First of all, one can identify the ends of the two stabilizer halves 1, 2 on the side of the coupling having a straight form wherein the connection of the stabilizer halves 1, 2 on the side of the wheels can be designed in a conventional manner and, therefore, is not shown in the figures.

The ends of the stabilizer halves 1, 2 on the side of the coupling are encased in a coupling housing 3, wherein the coupling housing 3 accommodates simultaneously the servo-electric drive element 4 for the stabilizer coupling. The actual clutch coupling is arranged in the longer cylindrical region 5 of the coupling housing.

Figure 1:
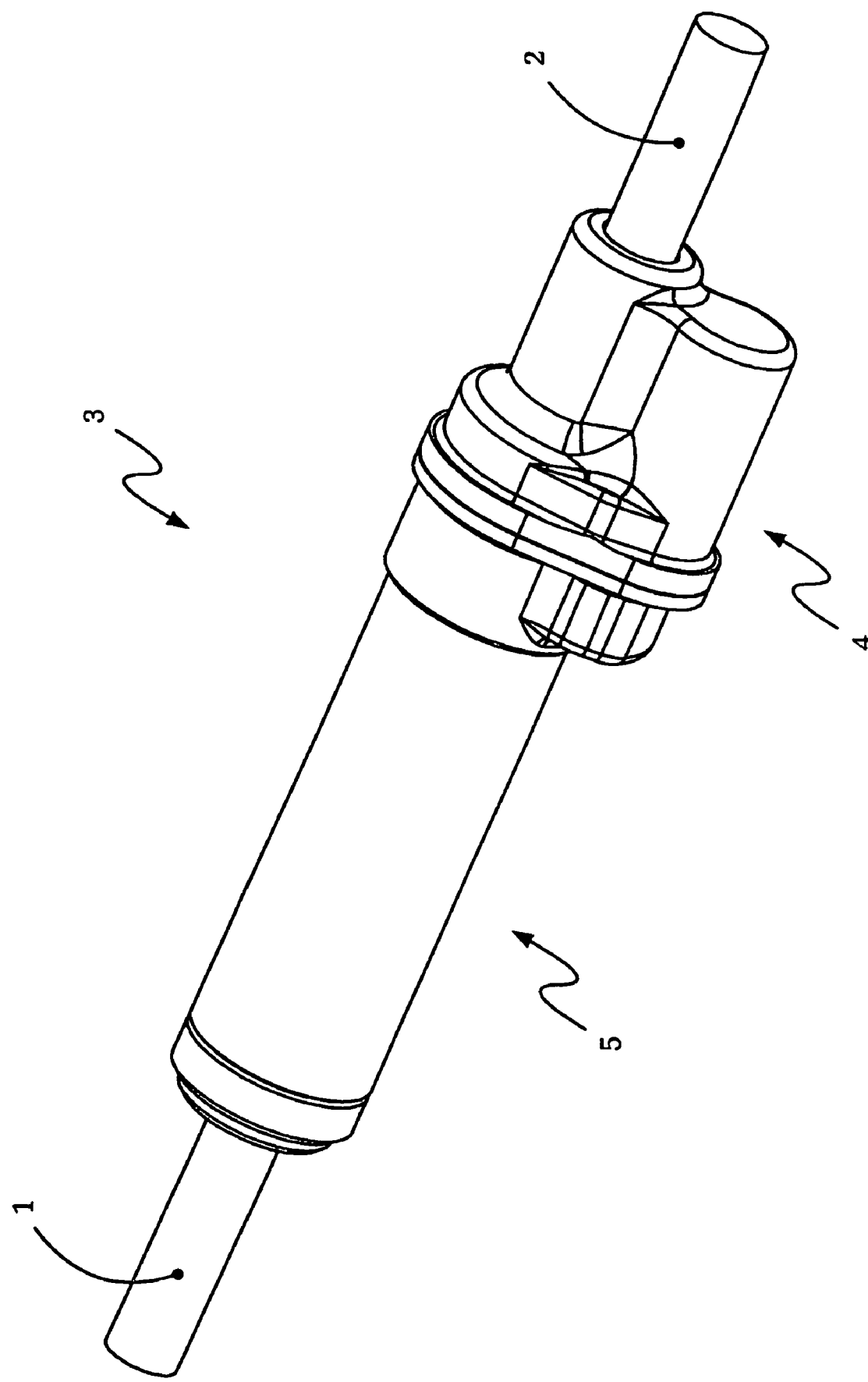
FIG. 1 is a schematic isometric projection of the center part of one embodiment of a stabilizer device according to the present invention.
Figure 2:
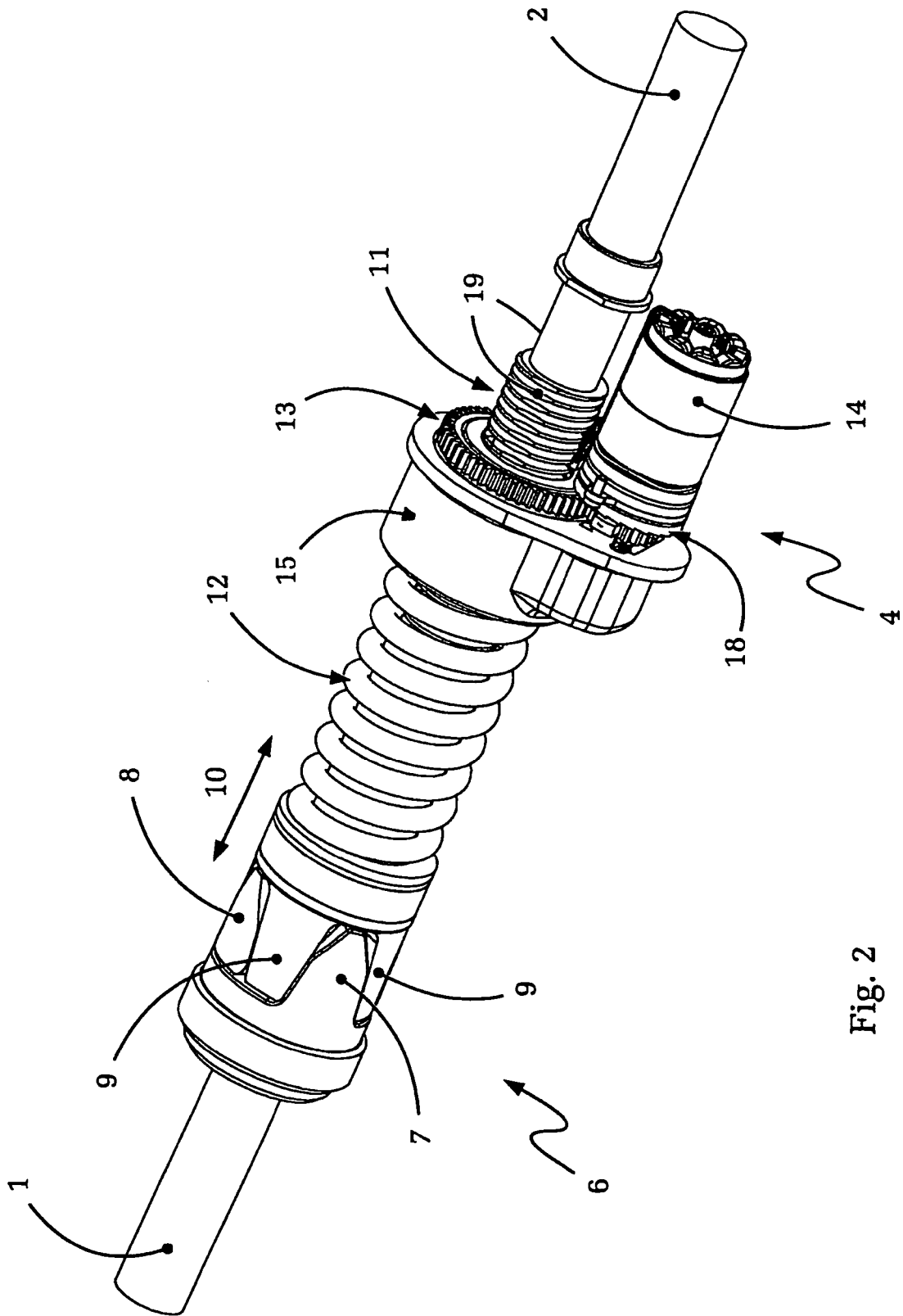
FIG. 2 is a presentation and view according to FIG. 1 of the stabilizer device according to FIG. 1 without housing.

FIG. 2 corresponds essentially to the presentation of FIG. 1, wherein in the presentation according to FIG. 2 the coupling housing 3 was removed to show the stabilizer coupling 6 and its servo-electric drive element 4. The clutch coupling 6 itself consists of two clutch devices 7 and 8, which are assigned to the two stabilizer halves 1 and 2 and connected firmly with each stabilizer half 1 and 2, respectively, and of the locking sleeve 9. The spring-loaded locking sleeve 9 can be shifted axially along the direction indicated by the arrow 10 and can thus be disengaged from the clutches of the clutch devices 7, 8 of the stabilizer halves 1, 2. In the displayed embodiment the two clutch devices 7 and 8, which are connected with the two stabilizer halves 1 and 2, features two locking clutches 7 and 8 each (of which only one of each can be seen in FIG. 2), whereas the locking sleeve 9 has four locking fingers 9.

In the presentation according to FIG. 2 the altogether four locking clutches of the clutch devices 7, 8 and the four locking fingers of the locking sleeve 9 are completely engaged, which means, that the two stabilizer halves 1, 2 are coupled with each other in a rotationally rigid manner.

The actuatoric shifting of the locking sleeve 9 along the direction indicated by the arrow is effected by the servo-electric drive element 4 by means of a recirculating ball spindle 11, wherefore the recirculation ball spindle 11 is connected in turn with the locking sleeve 9. The closing movement of the coupling 6 is supported by a compression spring 12, which in turn is pre-loaded during the opening movement of the coupling 6.

In addition, it can be seen that the clutches of the clutch devices 7, 8 have a wedge angle shaped in two different steps. In the region of the contact surfaces of the clutch devices 7, 8 with the locking fingers of the locking sleeve 9, the wedge angle is formed so flatly that in the shown closed state the clutch devices 7, 8 and the locking sleeve 9 are engaged in a virtually self-blocking state. This means that there is no need for applying significant axial forces to the locking sleeve 9 for maintaining the coupling 6 shut even under a high stabilizer-torsional moment load to keep the coupling 6 closed. Consequently, the coupling remains securely closed under any operating conditions merely due to the spring force of the compression spring 12.

On the other hand, the wedge angle in the region of the tips of the clutches 7, 8 of the clutch devices are shaped so steep, that in these regions no self-blocking between the clutch devices 7, 8 and the locking sleeve 9 occurs. Thus, the locking sleeve 9 always finds its way between the clutches of the clutch devices 7, 8 upon closing of the coupling 6; this occurs even when the deflection paths of the two wheels of the corresponding axle of the motor vehicle should differ from each other and the clutches of the clutch devices 7, 8 consequently should not be in the mutual neutral position according to FIG. 2. In addition, the wedge angle of the clutches 7, 8 shaped with two different steps results in a reduction of the axial shifting path 10 required to open and close the stabilizer coupling 6.

In the opened state the locking sleeve 9 is extended from the region of the clutches of the clutch devices 7, 8 axially along the direction indicated by the arrow 10 only so far, that a slight residual overlap between the active surfaces of the locking sleeve 9 and the active surfaces of the clutch devices 7, 8 remains. Thus, the locking sleeve 9 remains always loosely engaged with the clutches of the clutch devices 7, 8 and may consequently be forced back again between the clutches of the clutch devices through the force of the servo-motoric drive element 4 and the compression spring 12 regardless of the rotational relative position of the two clutch devices 7, 8 or alternatively of the two stabilizer halves 1, 2. However, the locking sleeve 9 is not fixed rotationally and as a result the free movement of the two clutch devices 7, 8 against each other is not obstructed by different deflection movements of the two wheels of the axle and consequently the whole tangential gap between the clutches of the clutch devices 7 and 8 (corresponding to the sum of the width of two of the four clutches of the locking sleeve 9) is available for the relative twisting of the two clutch devices 7, 8 and therefore of the stabilizer halves 1, 2.

As a consequence moreover, the servomotoric coupling drive element 4 supported by the compression spring 12 is able to move back the stabilizer halves 1, 2 into a neutral relative position due to the wedge effect of the clutches or else the fingers 7, 8, 9, even when the deflection of the stabilizer 1, 2 under load or else of the two wheels of the axle should be different.

In FIG. 2 the compression spring 12 for supporting the closing movement 10 of the locking sleeve 8 can be identified easily. Herein, the compression spring 12 is designed so that the closing movement of the locking sleeve 9 with the coupling 6 open may be carried out through the servo-electric drive element 4 even without support by a motor, for example in case a power failure of the servo-electric drive element 4 occurs. In this case, the locking sleeve 9, which is open and therewith is deployed in the right direction with regard to the drawing out of the region of the clutch devices 7, 8, will be moved back into the closing position shown in FIG. 2 through the force of the compression spring 12. Hereby, the spindle drive element inclusive of intermediate transmission 13 and electric motor 14 is actuated through the spindle nut 15 (cf. FIG. 3) and also through the preload force of the compression spring 12, which is made possible because the spindle drive element 4 is formed not self-blocking thanks to the use of a recirculating ball nut 15.

Figure 3:
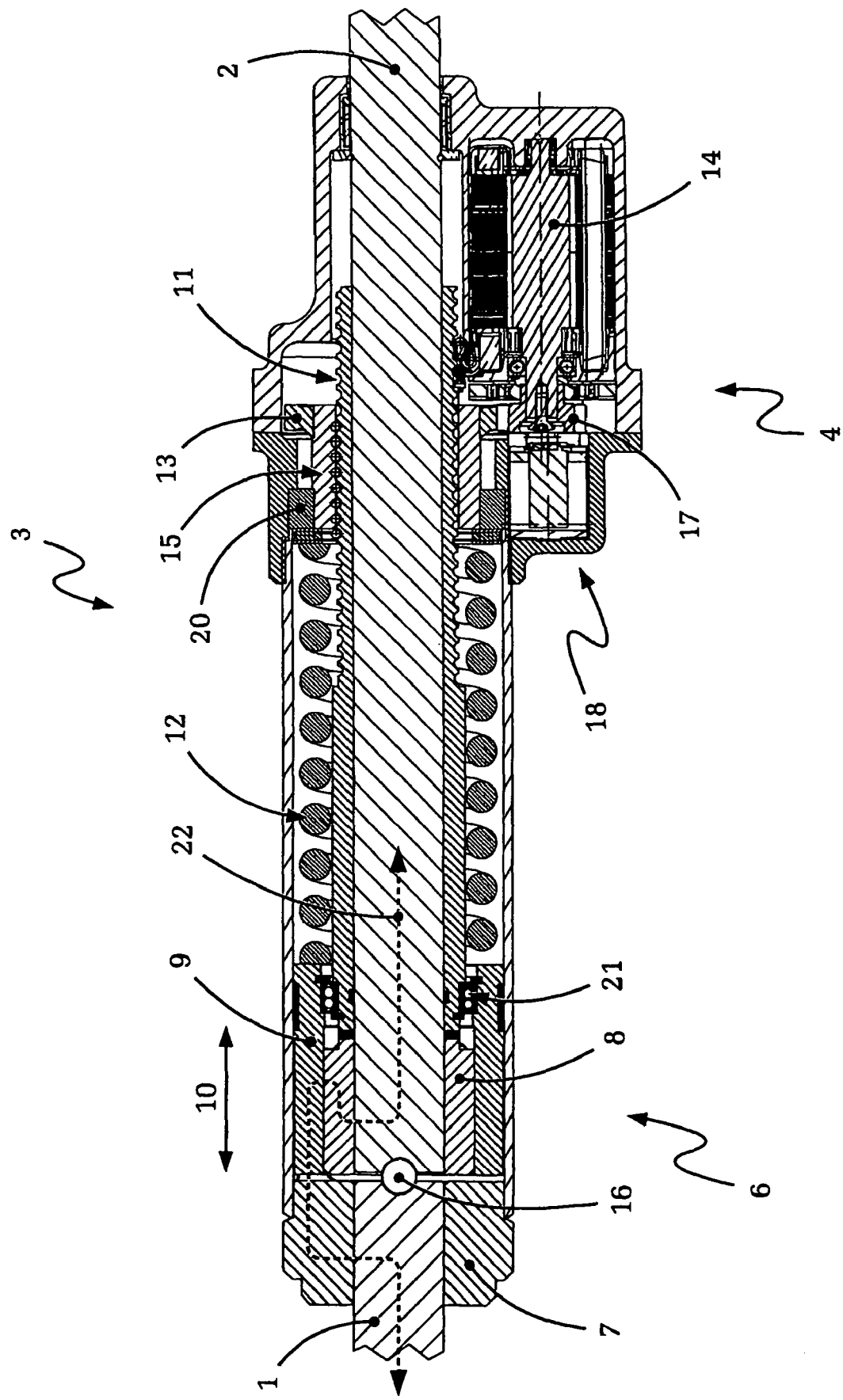
FIG. 3 is a sectional view of the stabilizer device according to FIG. 1 in longitudinal direction.

FIG. 3 shows a longitudinal section through the coupling device of the switchable roll stabilizer according to FIGS. 1 and 2. Firstly, the ends of the two stabilizer halves 1 and 2 on the side of the coupling can be identified. Again it is to be considered that the term "stabilizer half" is merely used for illustrational purposes and is especially not to be construed to mean, that the roll stabilizer has to be divided in the center. Since the whole coupling device is under considerable axial strain due to the compression spring 12 and additionally due to the servomotoric drive element 4 while being operated, a compression ball 16 is arranged between the front faces of the ends of the stabilizer halves 1, 2 for reducing the friction and for a defined abutting.

Furthermore, the servo-electric coupling drive element 4 provided with a brushless electric motor 14 and also with the pinion 17 arranged on the motor shaft and the gear rim 13 arranged on the recirculating ball nut 15 can be identified in FIG. 3.

The drive element 4 further comprises a locking device, which can be enabled electromagnetically, for blocking the motor shaft in the rotational direction of the motor 14 used for closing the coupling 6. The coupling 6 can be blocked in the opened position by means of the electromagnetic locking device 18 by activating the locking device 18. This means, that in case of a power failure of the coupling drive element 4 the locking effect of the locking device 18 is removed and then the recirculating ball nut 15 together with gear rim 13, pinion 17 and electric motor 14 is actuated into a rotational movement due to the force of the compression spring 12 and, as a result, the coupling 6 will be closed automatically.

To avoid a simultaneous rotation of the threaded spindle 11 and the recirculating ball nut 15 during the operation of the stabilizer coupling 6, the threaded spindle 11 is flattened on two opposite faces 19 (cf. FIG. 2) and is fixed rotational by means of corresponding flattenings with matching form (not shown) in the right part, with reference to the drawing, of the housing 3, whereby it remains possible at the same time to shift the threaded spindle 11 axially. The flattenings 19 of the threaded spindle 11 indicated in FIG. 2 are not located in the section plane in FIG. 3 and are therefore not discernible in FIG. 3.

For operating, i.e. for opening and closing, the coupling 6 the electric motor 14 is actuated to move in the appropriate rotational direction. Thereby, the recirculating ball nut 15 is actuated to move rotationally by means of the pinion 17 arranged on the motor shaft and by means of the gear rim 13 arranged over the recirculating ball nut 15. Herein, the recirculating ball nut 15 is arranged so that it can be rotated by means of the roller bearing 20, which is indicated only schematically in FIG. 3, but is fixedly arranged in an axial direction in the right part of the housing 3 with regard to the drawing. On the other hand, the threaded spindle 11 can be shifted axially in the right part of the housing 3 and is also fixed rotationally at the same time due to the flattenings 19 (cf. FIG. 2). As a result therefore, the threaded spindle 11 can be shifted in the desired axial direction depending on the chosen rotational direction of the electric motor 14, when the recirculating ball nut 15 is driven rotationally by the electric motor 14, which in turn results in the corresponding opening or closing operation of the clutch coupling 6.

The clutch coupling 6 consists of the two clutch devices 7 and 8 and also of the locking sleeve 9, wherein the clutch device 7 is connected with the left stabilizer half 1 with regard to the drawing and the clutch device 8 is connected with the right stabilizer half 2, for example by welding, whereas the locking sleeve 9 is connected with the left end of the threaded spindle 11 with regard to the drawing via an angular ball bearing 21 so that it can rotate freely but is axially rigid.

The section plane of the longitudinal section according to FIG. 3 passes herein trough two of the four clutches of the locking device 9 (cf. FIG. 2), and thus the clutches of the clutch device 7 and 8 are located outside the section plane and are therefore not visible in FIG. 3. However, the stabilizer coupling 6 is closed in the drawing according to FIG. 3 as well as in the drawing of FIG. 2, which means, that the clutch devices 7 and 8 and the locking sleeve 9—just as indicated in FIG. 2—are completely engaged with each other. In this manner, complete engagement between the two stabilizer halves is achieved via path 22 "left stabilizer half 1, left clutch device 7, locking sleeve 9, right clutch device 8, right stabilizer half 2", whereby the roll stabilizer according to the drawing in FIG. 3 is switched into the active state.

As a result, it becomes apparent, that the present invention provides a switchable roll stabilizer, which particularly has the advantage, compared with the state of the art, that its design can be realized cost efficiently and that it is constructively robust and at the same time compact. The switchable roll stabilizer according to the invention allows for the actuatorically support of the opening movement as well as of the locking movement of the stabilizer coupling. At the same time, the invention allows for a switchable roll stabilizer with extremely high reaction speeds as well as short switching times in fractions of seconds, whereby the stabilizer formed according to the present invention can be employed for an active support of the vehicle dynamics in real time, and in particular can be activated for the purpose of an active running gear only during passage of bends of the road. Moreover the servo actuatorical drive element of the stabilizer coupling allows for the exact and stepless control of the opening and the closing movement and allows the roll stabilizer consequently to take any intermediate position between "completely rigid" and "completely opened".

The present invention therefore contributes considerably to the promotion of the standard-production application of cost efficient and reliable switchable roll stabilizers.

| List of reference numerals | |
|---|---|
| 1 | left stabilizer half |
| 2 | right stabilizer half |
| 3 | housing |
| 4 | servo-electric drive element |
| 5 | coupling housing |
| 6 | clutch coupling |
| 7 | locking clutch, left clutch device (with two fingers) |
| 8 | locking clutch, right clutch device (with two fingers) |
| 9 | locking finger, locking sleeve (with four fingers) |
| 10 | shifting direction |
| 11 | threaded spindle |
| 12 | compression spring |
| 13 | intermediate transmission, gear rim |
| 14 | electric motor |
| 15 | recirculating ball nut |
| 16 | thrust ball |
| 17 | pinion |
| 18 | locking device |
| 19 | flattenings |
| 20 | roller bearing |
| 21 | angular ball bearing |
| 22 | transmission of torsional moment |

The invention claimed is:

1. Stabilizer device for an axle of a motor vehicle, the stabilizer device comprising a roll stabilizer and an actuatorically switchable coupling device wherein the roll stabilizer is formed divided into a left stabilizer half and into a right stabilizer half and the stabilizer halves are positively connectable with each other by means of the coupling device, the coupling device comprising two axially as well as radially overlapping clutch devices, which create at least a tangential gap and are connected each with one stabilizer half respectively, and a locking sleeve axially shiftable back and forth between a locking position and unlocking position wherein the locking sleeve has at least one locking finger, which can be accommodated in the tangential gap between the clutch devices in the locking position, further comprising:

a shifting device for shifting the locking sleeve by means of mechanical power transmission wherein the shifting device comprises a servo-electric transmission drive element, wherein one or more of the clutch devices and the locking fingers comprise active surfaces, each of which are formed in a wedge shape with steps such that a first step of the active surfaces has a self-blocking wedge angle, whereas a second step of the active surfaces does not have a self-blocking wedge-angle.

2. Stabilizer device according to claim 1, wherein said locking sleeve can be moved in a rotationally free manner.

3. Stabilizer device according to claim 1, wherein said shifting device comprises a spindle drive element with a threaded spindle.

4. Stabilizer device according to claim 3, wherein said spindle drive element comprises a recirculating ball nut.

5. Stabilizer device according to claim 1, further comprising:

a compression spring for supporting the locking movement of the locking sleeve in the direction of the locked position.

6. Stabilizer device according to claim 3, wherein said spindle drive is formed not self-blocking.

7. Stabilizer device according to claim 1, further comprising:
an actuatorically locking device for blocking the servo-electric transmission drive element in the rotational direction used for locking the coupling device.

8. Stabilizer device according to claim 7, wherein said locking device is deactivated in case of power supply failure and the blocking of the servo-electric transmission drive element is neutralized.

9. Stabilizer device according to claim 3, wherein said threaded spindle is essentially formed like a hollow cylinder and encloses one of the stabilizer halves coaxially.

10. Stabilizer device according to claim 9, wherein said compression spring encloses the threaded spindle coaxially.

11. Stabilizer device according to claim 10, wherein said locking fingers and clutch devices are arranged in the same radial diameter region as the compression spring and the recirculating ball nut.

12. Stabilizer device according to claim 1, further comprising:
a sensor device for detecting cornering maneuvers wherein the coupling device is arranged for automatic coupling of the stabilizer halves depending on a signal of the sensor device.

13. Stabilizer device according to claim 1, wherein the locking sleeve comprises an actuation path, and wherein said actuation path is steplessly controllable.

14. Stabilizer device according to anyone of the claims 1 to 11 or 12 to 13, wherein the clutch devices comprise locking clutches, and wherein said coupling device during straight running on the road is partially disengaged, wherefore the locking fingers of the locking sleeve overlap partially with the locking clutches of the clutch devices in an axial direction of the stabilizer.

* * * * *